(12) United States Patent
Podilchuk

(10) Patent No.: US 8,504,546 B2
(45) Date of Patent: Aug. 6, 2013

(54) METHOD AND SYSTEM FOR SEARCHING MULTIMEDIA CONTENT

(75) Inventor: Christine Podilchuk, Warren, NJ (US)

(73) Assignee: D&S Consultants, Inc., Eatontown, NJ (US)

( * ) Notice: Subject to any disclaimer, the term of this patent is extended or adjusted under 35 U.S.C. 154(b) by 652 days.

(21) Appl. No.: 11/947,734

(22) Filed: Nov. 29, 2007

(65) Prior Publication Data

US 2008/0126345 A1    May 29, 2008

Related U.S. Application Data

(60) Provisional application No. 60/861,686, filed on Nov. 29, 2006.

(51) Int. Cl.
    *G06F 7/00*    (2006.01)

(52) U.S. Cl.
    USPC ............................ 707/706; 382/118; 707/737

(58) Field of Classification Search
    USPC .................................. 707/1, 2, 3, 104.1, 706
    See application file for complete search history.

(56) References Cited

U.S. PATENT DOCUMENTS

| | | | |
|---|---|---|---|
| 4,503,557 A | 3/1985 | Maeda | |
| 4,901,362 A | 2/1990 | Terzian | |
| 5,459,739 A | 10/1995 | Handley et al. | |
| 5,751,286 A | 5/1998 | Barber | |
| 5,757,959 A | 5/1998 | Lopresti | |
| 5,761,538 A | 6/1998 | Hull | |
| 5,832,474 A | 11/1998 | Lopresti et al. | |
| 5,875,446 A | 2/1999 | Brown | |
| 5,940,778 A | 8/1999 | Marfurt et al. | |
| 6,104,835 A | 8/2000 | Han | |
| 6,161,130 A | 12/2000 | Horvitz | |
| 6,295,371 B1 | 9/2001 | Rucklidge | |
| 6,581,034 B1 | 6/2003 | Choi et al. | |
| 6,616,704 B1 | 9/2003 | Birman et al. | |
| 6,633,857 B1 | 10/2003 | Tipping | |
| 6,741,725 B2 | 5/2004 | Astle | |
| 6,898,469 B2 | 5/2005 | Bickford | |
| 6,915,009 B2 | 7/2005 | Foote | |
| 6,944,602 B2 | 9/2005 | Cristianin | |
| 6,990,217 B1 | 1/2006 | Moghaddam | |
| 7,054,847 B2 | 5/2006 | Hartman | |
| 7,783,085 B2 * | 8/2010 | Perlmutter et al. | ........... 382/118 |
| 2004/0105598 A1 * | 6/2004 | Kondo et al. | ................. 382/307 |

(Continued)

FOREIGN PATENT DOCUMENTS

EP    0949580    2/2001

OTHER PUBLICATIONS

Podilchuk, "A New Face Recognition Algorithm Using Bijective Mappings" 2005 IEEE Comp Soc Conf on Comp Vision and Pattern Recogn, Jun. 20-26, 2005, vol. 3, pp. 165 US.

(Continued)

*Primary Examiner* — Amy Ng

(74) *Attorney, Agent, or Firm* — Fox Rothschild LLP; Dennis M. Carleton

(57) ABSTRACT

A system for implementing a method for searching multimedia contents uses a pictorial edit distance to compare a search query consisting of an image to a database of images to determine the ranking of matches from closest match to least closest match between the search image and the images in the database or portions of the images in the database.

28 Claims, 5 Drawing Sheets

U.S. PATENT DOCUMENTS

| | | | |
|---|---|---|---|
| 2004/0202349 A1* | 10/2004 | Erol et al. | 382/100 |
| 2005/0129290 A1 | 6/2005 | Lo | |
| 2005/0147302 A1 | 7/2005 | Leung | |
| 2006/0107823 A1 | 5/2006 | Platt | |
| 2006/0112068 A1 | 5/2006 | Zhang | |
| 2006/0171603 A1* | 8/2006 | Jung et al. | 382/254 |
| 2006/0251339 A1 | 11/2006 | Gokturk et al. | |
| 2007/0133947 A1* | 6/2007 | Armitage et al. | 386/95 |
| 2007/0294612 A1* | 12/2007 | Drucker et al. | 715/500.1 |
| 2008/0052312 A1* | 2/2008 | Tang et al. | 707/104.1 |

OTHER PUBLICATIONS

Hsuan Shih, Lee, "A Fast Algorithm for Computing the Transitive Closure [etc]," IEEE Proc of the Int ICSC Cong on Comp Intel Meth and Appl, pub. 1999 (Jun. 22-25, 1999) US.

Bhatnagar et al "Syntactic Pattern Recognition of HRR Signatures," SPIE Proc. v 4053, 190, pp. 452-466, Soc of Photo-Opt Instrum Engineers, Bellingham WA (2000).

Oommenn et al "On Using Parametric String Databases and Vector Quantization [etc]," IEEE Proc. Int. Conf. on Sys, Man and Cyber, v 1, p. 511-517 IEEE, Piscataway NJ (1997).

Chen, "Fast Schemes for Computing Similarities Between Gaussian HMMs [etc]" EURASIP Jour on Appl Sign Pro (EURASIP J. Appl. Sig Pro v 2005, n13, Aug. 1, 2005 p. 1984-1993 US.

Asano, "Efficient Algorithms for Optimization-Based Image Segmentation" (NDN-174-0695-5802-4) IEEE Int Jour of Comp Geo & App, v11, No. 2, 2001 p. 145-166 US.

Menico, "Faster String Searches (Boyer-Moore Algorithm)" Dr. Dobb's Jour of Software Tools, v14 n7 pub 1989-07 p. 74-78 (US).

* cited by examiner

METHOD AND SYSTEM FOR SEARCHING MULTIMEDIA CONTENT

CROSS-REFERENCE TO RELATED APPLICATIONS

This application claims benefit of U.S. provisional patent application Ser. No. 60/861,686, filed on Nov. 29, 2006, which is herein incorporated by reference, and U.S. non-provisional patent application Ser. No. 11/619,092 filed on Jan. 2, 2007.

FIELD OF THE INVENTION

The present invention relates generally to the field of techniques for analyzing multimedia data and, in particular, methods and systems for searching a multimedia content for graphical objects of interest.

BACKGROUND OF THE INVENTION

Recognition of objects of interest (referred to herein as "targets") in graphical contents of 2D images is used by military, law enforcement, commercial, and private entities, as well as individuals. Typically, the goal of target recognition is identification or monitoring of one or more targets depicted in images produced by surveillance apparatuses or in images stored in respective databases or archives. In some instances, portions of the images may be accompanied or substituted with respective annotating texts and, as such, represent a multimedia content (i.e., combination of graphics and text).

It has been recognized in the art that there are difficulties associated with computerized comparing of the graphical contents of images and, specifically, with searching multimedia contents. In particular, many challenges in the field of computerized target recognition relate to identification more than one target or targets that change their appearance due to orientation, lighting conditions, or partial occlusions.

Despite the considerable effort in the art devoted to techniques for computerized searching of multimedia contents, further improvements would be desirable.

SUMMARY OF THE INVENTION

One aspect of the invention provides a method for searching a multimedia content that includes pluralities of content images and text documents. The method is based on an assessment of a similarity score between the compared images and/or annotating texts and uses a multimedia user graphical interface (MGUI). The similarity score is defined as a complement to a pictorial edit distance (PED), which is asserted as a weighted sum of a 2D representation of Insertion, Deletion, and Substitution Error terms of the Levenshtein algorithm for matching or searching one-dimensional data strings.

In one embodiment, the method comprises the steps of indexing content images using similarity score metric, developing the MGUI, providing query data including query images and/or query texts, and searching the multimedia content using the MGUI for information relevant to the query data based on similarity scores between the query data and the content images.

Other aspects of the present invention provide an apparatus and system using the inventive method for searching a multimedia content.

Various other aspects and embodiments of the invention are described in further detail below.

The Summary is neither intended nor should it be construed as being representative of the full extent and scope of the present invention, which these and additional aspects will become more readily apparent from the detailed description, particularly when taken together with the appended drawings.

Figure 1:
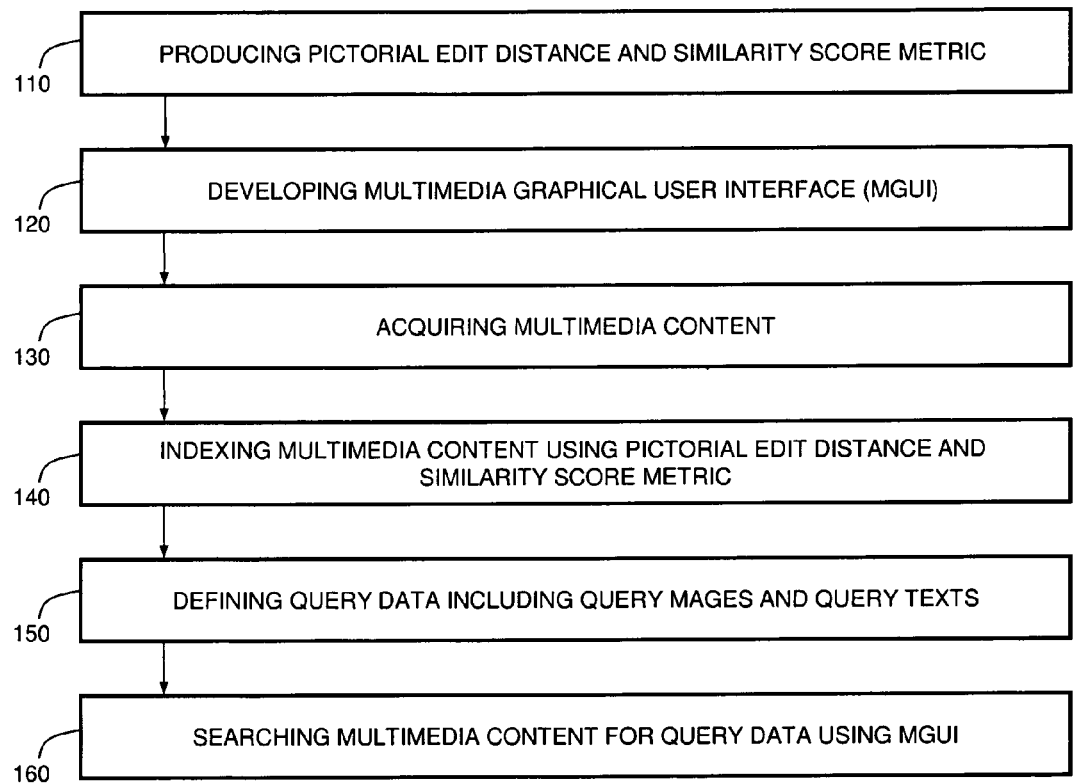
FIG. 1 is a flow diagram illustrating a method for searching a multimedia content in accordance with one embodiment of the present invention.

To facilitate understanding, identical reference numerals have been used, where possible, to designate similar elements that are common to the figures, except that suffixes may be added, when appropriate, to differentiate such elements. The images in the drawings are simplified for illustrative purposes and have not necessarily been drawn to scale.

The appended drawings illustrate exemplary embodiments of the invention and, as such, should not be considered as limiting the scope of the invention that may admit to other equally effective embodiments. It is contemplated that features or steps of one embodiment may beneficially be incorporated in other embodiments without further recitation.

DETAILED DESCRIPTION

Figure 2:
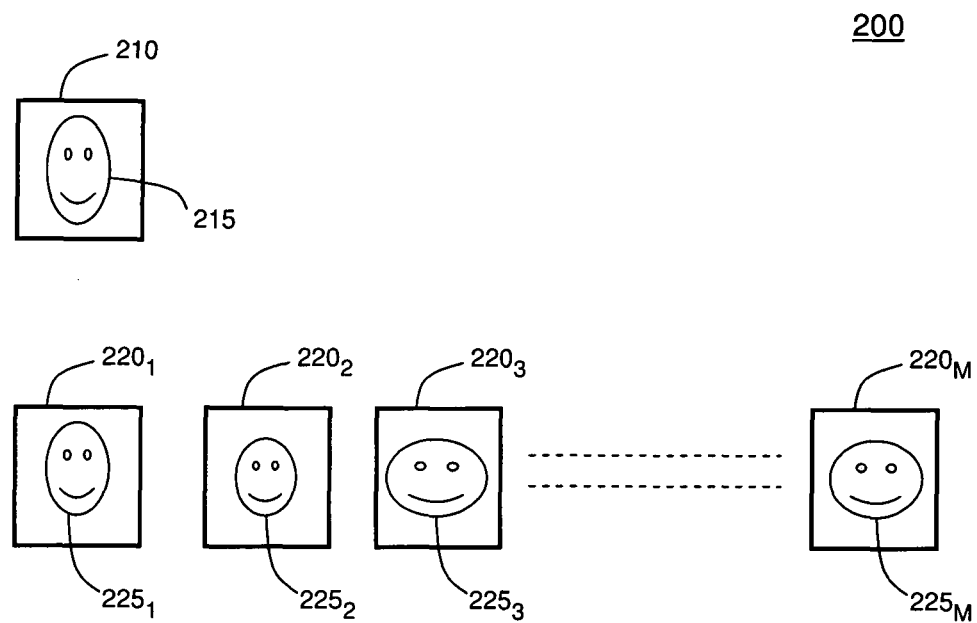
FIG. 2 is a schematic diagram depicting exemplary query and content images compared using the method of FIG. 1.
Figure 3:
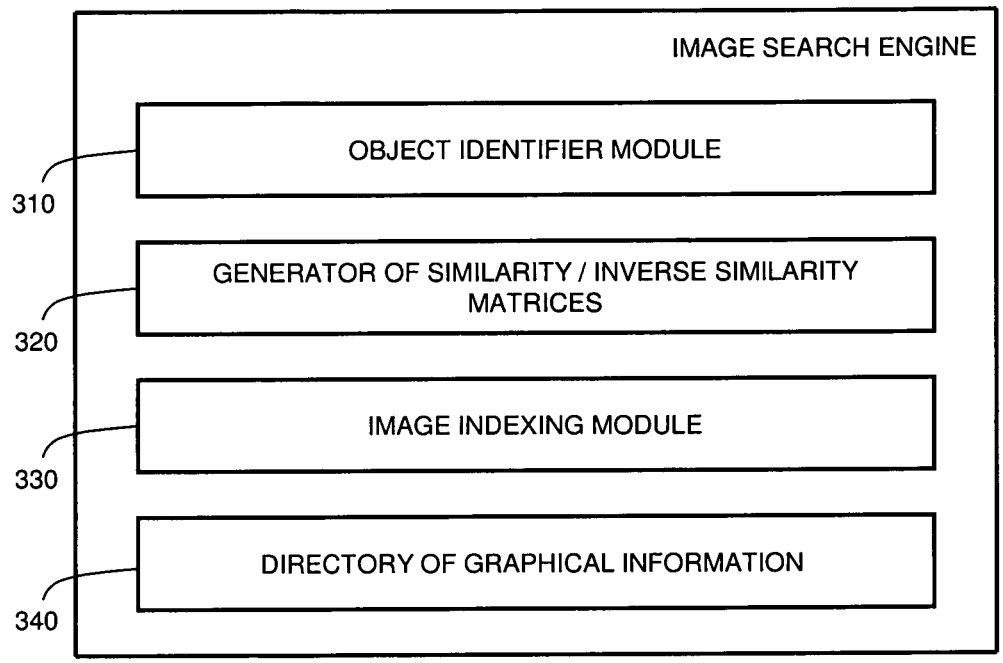
FIG. 3 is a schematic diagram illustrating an image search engine used by the method of FIG. 1
Figure 4:
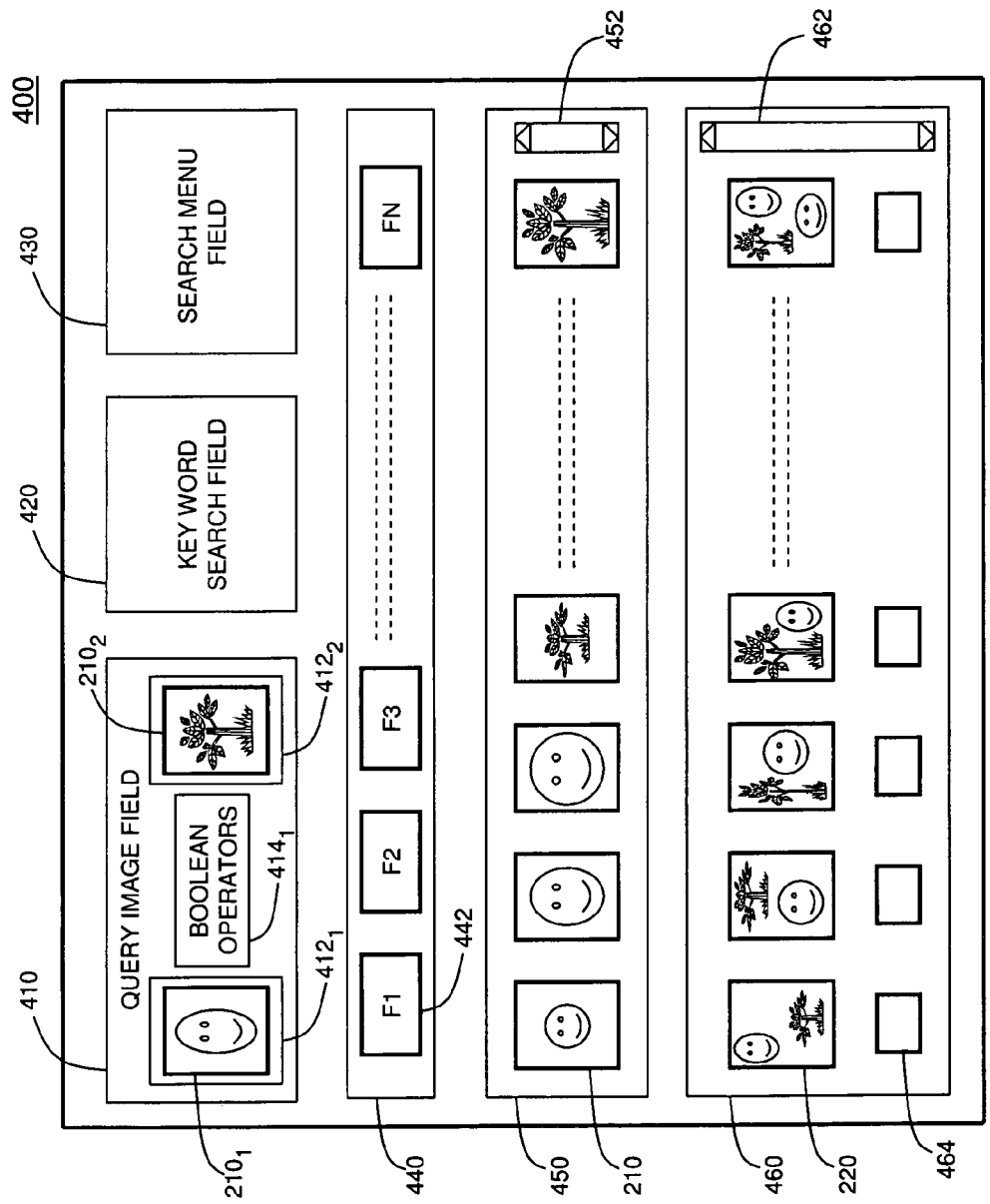
FIG. 4 is a schematic diagram illustrating an embodiment of a multimedia user graphical interface used by the method of FIG. 1.

Referring to the figures, FIG. 1 depicts a flow diagram illustrating a method 100 for searching a multimedia content in accordance with one embodiment of the present invention, FIG. 2 depicts a schematic diagram 200 illustrating exemplary query and content images compared using the method 100, and FIGS. 3-4 depict an image search engine (ISE) and a multimedia user graphical interface (MGUI), respectively, which are used in an embodiment of the method 100. To best understand the invention, the reader should refer to FIGS. 1-4 simultaneously.

In various embodiments, method steps of the method 100 are performed in the depicted order or at least two of these steps or portions thereof may be performed contemporaneously, in parallel, or in a different order. For example, portions of steps 130 and 140 or steps 150 and 160 may be performed contemporaneously or in parallel. Those skilled in the art will readily appreciate that the order of executing at least a portion of other discussed below processes or routines may also be modified.

Aspects of the present invention are illustratively described below within the context of images depicting live objects such as humans or body parts thereof. The invention may also be utilized within context of images depicting material objects, such as missiles or their plumes, vehicles, objects floating in air, free space, or liquid, beams of light, and the like, as well as images depicting a combination of various live or material objects. It has been contemplated and is within the scope of the invention that the method 100 is utilized within the context of such images.

At step 110, pictorial edit distance (PED) and similarity score metrics are provided for a multimedia content that may include a graphical content (referred hereafter to as "content images"), text documents, or a combination thereof. Some content images may selectively include textual annotations, which allow association of such images with particular key words.

The PED is asserted as a weighted sum of a 2D representation of Insertion, Deletion, and Substitution Error terms of the Levenshtein algorithm for matching or searching one-dimensional data strings, and the similarity score is defined as a complement to the PED. Techniques for determining the PEDs and similarity scores and comparing images using these properties are disclosed in commonly assigned U.S. patent application Ser. No. 11/619,133 filed on Jan. 2, 2007, Ser. No. 11/619,092, filed on Jan. 2, 2007 and Ser. No. 11/619,121, filed on Jan. 2, 2007, all of which are herein incorporated by reference. Techniques for determining PEDs and similarity scores and comparing images using these properties are further disclosed in the commonly assigned U.S. patent applications by C. Podilchuk entitled "Method and System for Comparing Images Using a Pictorial Edit Distance," filed simultaneously herewith on this date, and "Method and System for Image Recognition Using a Similarity Inverse Matrix," simultaneously filed herewith on this date, the contents all of which are incorporated herein by reference. Salient features of these techniques are briefly discussed below.

Referring to FIG. 2, M exemplary content images 220 may be analyzed using a similarity matrix SM, $$SM = \begin{pmatrix} S_{11} & \cdots & S_{1M} \\ \vdots & \ddots & \vdots \\ S_{M1} & \cdots & S_{MM} \end{pmatrix}. \qquad \text{(Eq. 1)}$$

Matrix elements $S_{ij}$ of the similarity matrix SM are defined as similarity scores between content images $220_i$ and $220_j$, where i and j are integers and i+j=M. In the similarity matrix SM, each content image 220 forms a diagonal matrix element, and similarity scores of the content images 220 one versus another form non-diagonal matrix elements.

Diagonal matrix elements (i.e., matrix elements $S_{ii}$ or $S_{jj}$) relate to similarity scores of the respective content images versus themselves and, as such, are unity matrix elements (i.e., matrix elements which numerical value is equal to 1). Correspondingly, since similarity scores $S_{ij}$ and $S_{ij}$ for the respective content images $220_{ij}$ and $220_{ji}$ are equal to one another, the similarity matrix 300 is a symmetric matrix, and numerical values of the non-diagonal matrix elements are disposed in a range from 0 to 1.

To determine the similarity score between the content image $220_i$ and $220_j$, an image disparity map is calculated for these images using a respective block matching algorithm. Using cost functions such as, for example, a mean absolute difference (or L1 error) or a mean square error (or L2 error), the image disparity map identifies disparity between pre-selected elementary blocks of pixels in the content images $220_i$ and $220_j$ as a weighted sum of the one-to-many, one-to-none, and matching error correspondences between the blocks of pixels.

These types of correspondences are expressed using terms of the Levenshtein algorithm as follows: (i) one-to-many correspondence between the elementary blocks is asserted as an equivalent of an Insertion term, (ii) one-to-none correspondence between the elementary blocks is asserted as an equivalent of a Deletion term, (iii) partial matching between the elementary blocks is asserted as an equivalent of a Substitution Error term, and (iv) a PED between the compared images is asserted as an equivalent of a Levenshtein's Edit Distance.

Herein, the term "one-to-many correspondence" relates to an elementary block matching, with a cost function smaller than a first pre-determined threshold Q1, two or more elementary blocks of the other image. Accordingly, the term "one-to-none correspondence" relates to an elementary block having no match among the elementary blocks of the other image (i.e., elementary block which cost function, with respect to the elementary blocks of the other image, is greater than a second pre-determined threshold Q2). The term "partial matching" relates to the elementary blocks which cost functions, with respect to the elementary blocks of the other image, are disposed between Q1 and Q2, i.e., Q1≦Q≦Q2.

Referring back to FIG. 2, the content images 220 may be compared to or searched for an exemplary query image 210 or one another, when the query image is selected from the content images. Illustratively, each of the content images 220 depicts a respective object 225 that is compared to a target 215 depicted in the query image 210. Generally, the target 215 and objects 225 are depicted surrounded by live or material elements of their respective conventional habitats, conditions, or environments. For a purpose of graphical clarity, in the images 210 and 220 such elements are not shown.

Herein, the method 100 is discussed referring to the content and query images depicting a single object (content images 220) or a single target (query image 210). In alternate embodiments, content and query images depicting several such objects or targets may similarly be compared using processing steps of the method 100.

In the depicted exemplary embodiment, the query and content images 210, 220 are digitized 2D images having the same digital resolution (i.e., number of pixels per unit of area), and their graphical contents (i.e., target 215 and objects 225) have approximately the same physical dimensions, or scale factors.

Generally, at least a portion of these properties in available samples of the query and content images may differ from one another or at least one of the query and content images 210, 220 may be a portion of a larger image plane. In operation, respective properties of such query and content images are normalized.

In particular, a normalization process may adjust scale factors or digital resolution of the query or content images, equalize or approximately equalize physical dimensions of particular elements in the images or the images themselves, produce copies of the query and content images having different digital resolutions, and the like. Such normalization of the images increases probability and reduces computational complexity of recognizing the target 215 in graphical contents of the content images 220.

The query and content images 210, 220 may be compared using a query vector V, $$V = \begin{bmatrix} V_{q1} \\ V_{q2} \\ -- \\ V_{qM} \end{bmatrix} \qquad \text{(Eq. 2)}$$

or an adjusted query vector $V_{ADJ}$ calculated as a product of the vector V and the inverse similarity matrix SIM, i.e., $$V_{ADJ} = V \cdot (SIM). \qquad \text{(Eq. 3)}$$

Herein the inverse similarity matrix SIM is a matrix that, when multiplied by the similarity matrix SM, forms a unitary diagonal identity matrix IM, i.e., $$(SIM)\cdot(SM)=IM, \quad \text{(Eq. 4)}$$

and elements $S_{qk}$ of the query vector V are selectively defined as similarity scores between the query image 210 and a respective content image $220_k$, where k is an integer in a range from 1 to M.

In a further embodiment, the query image 210 may be compared to the content images 220 at least a portion of which is morphed, using respective graphics software, to examine how such variations relate to the similarity scores between the target 215 and the objects 225. In particular, such graphics software may produce morphed content images 220 where lighting conditions, poses, or attributes (for example, clothing, hand-held or wearable objects, and the like) of the objects 225 are selectively modified.

In another embodiment, a plurality of the query images $210_n$, where n is an integer and n>1, may similarly be compared to the content images 220. In yet another embodiment, a plurality of thresholds T may be defined to identify particular groups of the content images (for example, groups which similarity scores with the respective query image(s) 210 correspond to pre-selected ranges of the similarity scores).

Referring to FIG. 3, the content images 220 are indexed, or systemized, using an image search engine (ISE) 300. The ISE 300 is generally a computer program that may be executed on a computer terminal 500 (discussed in reference to FIG. 5 below) such as, for example, a general purpose computer, a workstation, or a server. In one embodiment, the ISE 300 generally includes an object identifier module 310, a generator 320 of matrices SMs and/or SIMs, an image indexing module 330, and a database 340 of graphical information.

In the depicted embodiment, the object identifier module 310 is adapted to identify acquired content images 220 and text documents of the multimedia content. In further embodiments, the object identifier module 310 may also identify a particular graphical content, for example, images of humans, vehicles, and the like.

Using the generator 320, the acquired content images 220 are normalized and the matrices SM and SIM are produced. In some embodiments, using certain pre-determined strategies, the content images 220 are optionally morphed and the matrices SM and SIM for such morphed images are also produced.

The image indexing module 330 generally performs docketing, analysis, and systemization of the matrices SM and SIM to define clusters, or classes, of particular types of images, such as, for example, people, cars, scenery, and the like.

The database 340 contains the content images 220 and data produced by the object identifier module 310, generator 320, and image indexing module 330. In some embodiments, to accelerate efficiency of particular searches, portions of such data (for example, data corresponding to the multimedia content acquired within specific time interval, relating to specific geographical region, and the like) may form, temporarily or permanently, independently searchable sub-databases.

The database 340 and such sub-databases may be searched for particular query images 210 using, for example, techniques disclosed in commonly assigned U.S. patent application Ser. No. 11/619,104, and by the commonly assigned U.S. patent application by C. Podilchuk entitled "Method and System for Searching a Database of Graphical Data" simultaneously filed herewith on this date, the contents of which are herein incorporated by reference.

At step 120, referring to FIG. 4, the method 100 develops a multimedia user graphical interface (MGUI) 400. The MGUI 400 is generally a computer program that, in operation, enables a user to utilize computational resources of the ISE 300. Features of the MGUI 400 may be activated using a conventional pointing device, such as a computer mouse, touch pad, and the like.

Specifically, the MGUI 400 allows the user to search the multimedia content for the query data including (i) one or more query images or (ii) a combination of one or more query images and one or more query texts, such as key words or annotations to particular content or query images. In further embodiments, the MGUI 400 may also facilitate searching the multimedia content for particular image elements (for example, specific face or eye pattern, scenery, and the like), administering manipulating, resizing, or morphing of the images, or perform searches using Boolean operators, among other search strategies.

In the depicted exemplary embodiment, the MGUI 400 includes a query image field 410, a key word search field, 420, a search menu field 430, a toolbar field 440 (N tools are shown), a working area field 450, and a search results field 460. Illustratively, the fields 450 and 460 are provided with scroll bars 452 and 462 facilitating viewing of large numbers of query and content images.

The query image field 410 includes query areas 412 for the selected query images 210 and logic areas 414 for Boolean operators establishing particular logical relationships between the query images 210 (two areas 412 and one area 414 are shown). The respective query images 210 may be placed in the query areas 412 (for example, dragged using a computer mouse) from the working area field 450 including a plurality of pre-selected query images.

In one embodiment, the pre-selected query images form a searchable library (i.e., database) of such images and may be retrieved from the library to populate the working area field 450 or the query areas 412. Searches based on the query images 210 may further be supplemented with or replaced by key word searches. For example, at least some of query images 210 or content images 220 may be replaced with annotated texts describing the contents of these images.

The content images 220, which similarity scores with the respective query data (i.e., query image(s) 210, query text(s), or combinations thereof) exceeds a pre-selected threshold T, are shown in the search results field 460 (illustratively, in the depicted embodiment, the Boolean operator 414 is "AND"). In one embodiment, the search results field 460 includes areas 464 containing similarity scores of the respective content images and identifying a content image having a highest similarity score with the query data. Such and other specific features of the MGUI 400 may be initiated using the respective tools of the toolbar field 440, commands listed in the search menu field 430, a computer pointing device, or a combination thereof.

At step 130, in operation, a multimedia content of interest is acquired by a user of the respective computer terminal 500.

At step 140, using the ISE 300, a graphical content of the acquired multimedia content is processed, as discussed above in step 110 in reference to the content images 220.

At step 150, using the MGUI 400, the user selectively provides search instructions from the search menu 430, enables tools of the toolbar 440, and defines the query data, i.e., selects one or more the key images (i.e., query images 210), places them in the query image field 410, and, in some embodiments, enters in the key word search field 420 a query text including one or more user-defined key words.

At step 160, following the user-selected instructions, the method 100 uses the ISE 300 to perform searching of the multimedia content for the query data of step 150 and, using the MGUI 400, displays search results. Upon reviewing the search results, the user may modify the search instructions or the query data and repeat the search of the multimedia content using a new set of instructions or the query data.

In exemplary embodiments, the method 100 may be implemented in hardware, software, firmware, or any combination thereof in a form of a computer program product comprising computer-executable instructions. When implemented in software, the computer program product may be stored on or transmitted using a computer-readable medium adapted for storing the instructions or transferring the computer program product from one computer to another.

Figure 5:
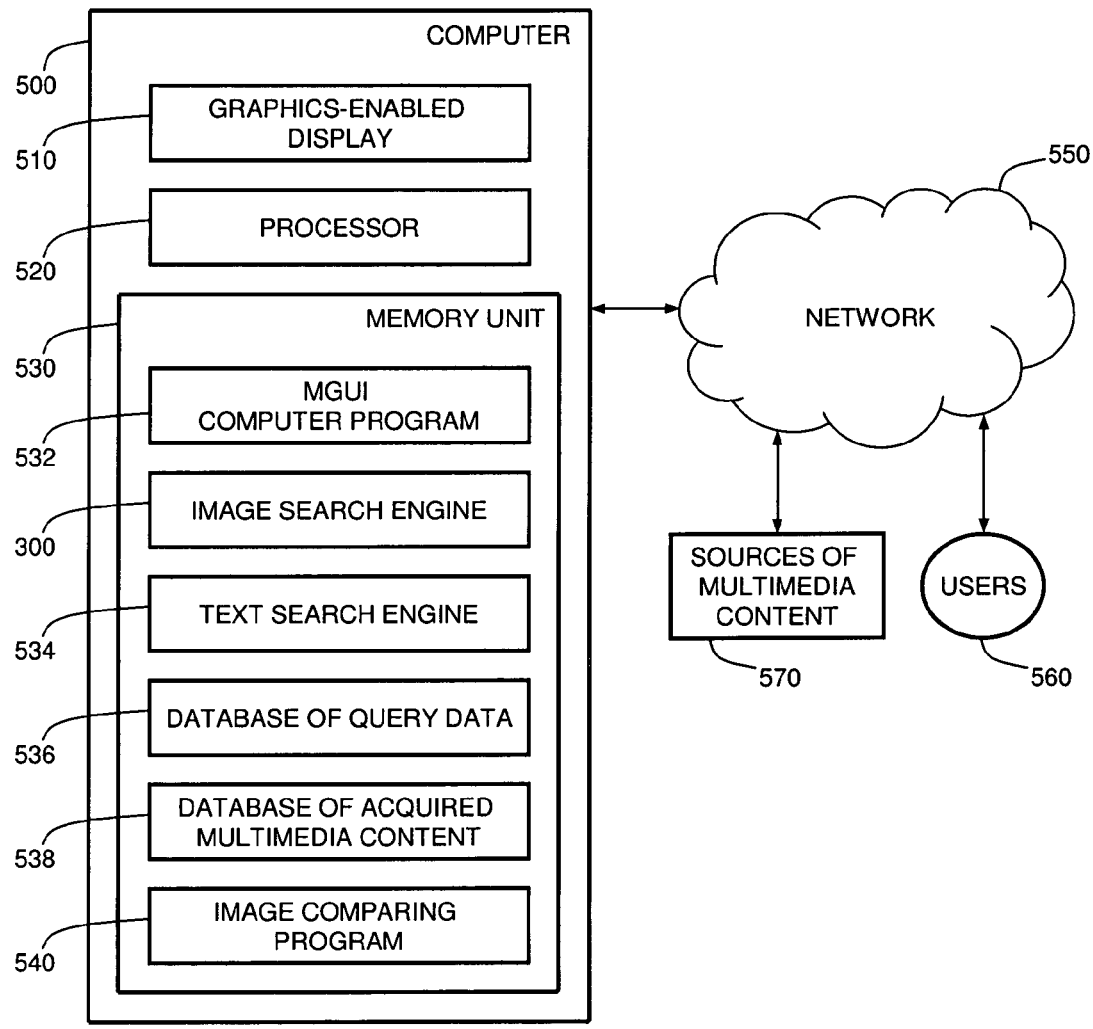
FIG. 5 is a high-level, schematic diagram of an exemplary apparatus using the method of FIG. 1.

FIG. 5 is a high-level, schematic diagram of an exemplary apparatus 500 using the method 100. The apparatus 500 is generally a computer terminal coupled to a network 550 (for example, the Internet, a wide area network (WAN), a local area network (LAN), and the like), which interconnects pluralities of users 560 and sources 560 of multimedia content.

Illustratively, the apparatus 500 is a computer (e.g., general purpose computer or a workstation) comprising a graphics-enabled display 510, a processor 520, and a memory unit 530. In one embodiment, the memory unit 530 includes a MGUI computer program 532, the ISE 300, a text search engine 534, a database 536 of query data, a database 538 of acquired multimedia content (for example, multimedia content acquired from the source(s) 570), and an image comparing program 540.

When executed by the processor 520, the program MGUI computer program 532, the ISE 300, and the text search engine 534, together, facilitate processing steps of the method 100. In particular, the MGUI computer program 532 enables the MGUI 400, and a graphical portion of the acquired multimedia content is processed using the ISE 300. In operation, the MGUI 400 allows a user to search the processed multimedia content as discussed above in reference to FIGS. 3-4.

In alternate embodiments, at least some of the MGUI computer program 532, ISE 300, text search engine 534, or image comparing program 540, as well at least one of the databases 536 or 538 may reside on a removable magnetic or optical media (e.g., flash memory card or drive, compact disc (CD), DVD, Blu-Ray and/or HD optical disks and the like), a server (not shown) of the network 150, or a remote computer (not shown) coupled to the network 150 or any other storage medium (not shown) coupled to the network 150, including magnetic media such has hard disk drives, tapes, and the like. In other embodiments, some query images 210 may be selected from images contained in the database 538 (i.e., from content images 220).

Although the invention herein has been described with reference to particular illustrative embodiments, it is to be understood that these embodiments are merely illustrative of the principles and applications of the present invention. Therefore numerous modifications may be made to the illustrative embodiments and other arrangements may be devised without departing from the spirit and scope of the present invention, which is defined by the appended claims.

What is claimed is:

1. A method for searching a multimedia database including content images, videos and text documents, comprising:
   (a) receiving query data including one or more query images; and
   (b) searching the multimedia database for the closest match between said one or more query images and said content images based on a similarity score between said query images and a compared portion of said content images, wherein said similarity score is defined as a complement to a pictorial edit distance between the query image and the compared portion of said content images, said pictorial edit distance being asserted as a weighted sum of Insertion, Deletion, and Substitution Error terms;
   wherein an insertion term is defined as a one-to-many correspondence between blocks of pixels in the content image and blocks of pixels in the query image;
   wherein a deletion term is defined as a one-to-none correspondence between blocks of pixels in the content image and blocks of pixels in the query image; and
   wherein a substitution term is defined as a cost function associated with partial matching between blocks of pixels in the content image and blocks of pixels in the query image.

2. The method of claim 1, wherein at least some of the content or query images are portions of larger image planes.

3. The method of claim 1, wherein said query data may include one or more query text strings, further comprising the step of:
   searching for matches between said one or more query text strings and text strings in said content database associated with specific content images.

4. The method of claim 1, further comprising the step of adjusting at least one of a digital resolution or a scale factor of the content or query images prior to step (b).

5. The method of claim 1, wherein the said one or more query images are selected from said content images.

6. The method of claim 1, further comprising the step of morphing at least a portion of the query images prior to step (b).

7. The method of claim 6, wherein said morphing step comprises:
   modifying at least one of lighting conditions, poses, or attributes of elements of graphical contents of the query images.

8. The method of claim 1, further comprising the step of displaying the content images having similarity scores that exceed a pre-selected threshold when compared to said one or more query images.

9. The method of claim 8, further comprising the step of displaying a degree of a similarity between the content images and the query image and ranking said content images based on said degree of similarity to said search image.

10. The method of claim 1, further comprising the step of identifying a content image having a highest similarity score with the query data.

11. A system comprising a computer having software installed thereon, said software performing the functions of claim 1.

12. A non-transitory computer readable medium storing software that, when executed by a processor, causes an apparatus or system to perform the method of claim 1.

13. A method for searching a multimedia database including content images, videos and text documents, comprising:
   (a) receiving query data including at least one or more query images; and
   (b) searching the multimedia database for the closest match between said one or more query images and said content images based on a similarity score between said query images and a compared portion of said content images, wherein said similarity score is defined as a complement to a pictorial edit distance between the query image and the compared portion of said content images;

wherein said pictorial edit distance is determined using a pre-determined block matching algorithm for comparing (i) matrices of blocks of pixels of the content images or (ii) matrices of blocks of pixels of the query and content images;

wherein said pictorial edit distance between the query image and the compared portion of said content images and asserted as a weighted sum of a 2D representation of said Insertion, Deletion, and Substitution Error terms of the Levenshtein algorithm; and wherein a degree of correlation between the blocks of pixels is expressed using the terms of the Levenshtein algorithm as follows:

defining one-to-many correspondence between the blocks of pixels as an equivalent of an Insertion term;

defining one-to-none correspondence between the blocks of pixels as an equivalent of a Deletion term; and defining a cost function associated with partial matching between the blocks of pixels as an equivalent of a Substitution Error term.

14. The method of claim 13, further comprising:

asserting the one-to-many correspondence between the blocks of pixels when a value of the cost function is smaller than a first pre-determined threshold;

asserting the one-to-none correspondence between the blocks of pixels when a value of the cost function is greater than a second pre-determined threshold; and asserting partial correspondence between the blocks of pixels when a value of the cost function is disposed between the first and second pre-determined thresholds.

15. The method of claim 14, wherein the value of the cost function is based on a mean absolute difference or a mean square error between said blocks of pixels.

16. An apparatus for searching multimedia content, comprising:

a graphics-enabled display;
a memory unit, and
a processor adapted to execute software having instructions causing the apparatus to perform the steps of:
(a) receiving query data including one or more query images; and
(b) searching the multimedia database for the closest match between said one or more query images and said content images based on a similarity score between said query images and a compared portion of said content images, wherein said similarity score is defined as a complement to a pictorial edit distance between the query image and the compared portion of said content images and asserted as a weighted sum of a 2D representation of Insertion, Deletion, and Substitution Error terms;

wherein an insertion term is defined as a one-to-many correspondence between blocks of pixels in the content image and blocks of pixels in the query image;

wherein a deletion term is defined as a one-to-none correspondence between blocks of pixels in the content image and blocks of pixels in the query image; and wherein a substitution term is defined as a cost function associated with partial matching between blocks of pixels in the content image and blocks of pixels in the query image.

17. The apparatus of claim 16, wherein said apparatus is a computer or a workstation.

18. The apparatus of claim 16, wherein the software resides in the memory unit, on a removable media, or on a server of a network including said apparatus.

19. The apparatus of claim 16, wherein the software comprises:

an image search engine;
a text search engine;
a database of the multimedia content; and
an image comparing program.

20. The apparatus of claim 16, wherein at least some of the content or query images are portions of larger image planes.

21. The apparatus of claim 16, further adapted to perform the step of adjusting at least one of a digital resolution or a scale factor of the content or query images.

22. The apparatus of claim 16, further adapted to perform the step of annotating at least a portion of the content images based on similarity scores of the content images with a pre-selected graphical content.

23. The apparatus of claim 16, further adapted to perform the step of displaying the content images having similarity scores that exceed a pre-selected threshold when compared with said one or more query images.

24. A system for searching a multimedia database comprising:

a computer;
software installed and running on said computer for implementing the process of:
creating a similarity matrix containing similarity scores for each image in said multimedia database versus all other images in said multimedia database, said similarity score being based on a pictorial edit distance;
creating a search vector containing similarity scores between a query image and each image in said multimedia database;
adjusting said search vector by multiplying said search vector by the inverse of said similarity matrix; and
identifying images from said multimedia database that match said search image by selecting images having a similarity score from said adjusted search vector exceeding a predetermined threshold; and
software, installed on said computer for calculating said pictorial edit distance by performing the steps of:
dividing a content image from said multimedia database into a plurality of blocks of pixels;
matching each of said blocks of pixels to a best match block of pixels in said search image;
determining, for each of said blocks of pixels from said content image, a matching error between said block of pixels from said content image and its best match block of pixels from said search image;
determining the portion of said search image not contained in any best match block of pixels;
determining the portion of said search image contained in multiple best match blocks of pixels; and
calculating said pictorial edit distance as the weighted sum of the matching errors for all blocks of pixels, the portion of said search image not contained in any best match blocks and the portion of said search image contained in multiple best match blocks.

25. The system of claim 24 wherein said similarity scores in said search vector are based on a comparison of a portion of said search image versus a portion of each of said content images in said multimedia database.

26. The system of claim 24 wherein said search image and/or each of said content images are adjusted such as to have the same digital resolution.

27. The system of claim 24 wherein said search image and/or said content images are adjusted by a scaling factor.

28. The system of claim 24 wherein said search image is accompanied by a search text string and further wherein said step of identifying matching images includes the step of comparing said search text string to a text string associated with said content images and selecting only those content images having associated text strings which are determined to match said search text string based on predetermined criteria.

* * * * *